US005251445A

United States Patent [19]

Farell et al.

[11] Patent Number: 5,251,445

[45] Date of Patent: Oct. 12, 1993

[54] HAND OPERATED HYDRAULIC PUMP HAVING PRESSURIZED RESERVOIR WITHIN PISTON

[75] Inventors: Robert E. Farell, Scarsdale; Ronald Johnson, Putnam Valley, both of N.Y.

[73] Assignee: Hydra-Ram Inc., North Salem, N.Y.

[21] Appl. No.: 770,413

[22] Filed: Oct. 3, 1991

[51] Int. Cl.[5] .................... F16D 31/02

[52] U.S. Cl. .................... 60/474; 60/478; 60/479

[58] Field of Search .................... 60/473, 474, 475, 477, 60/478, 479, 413, 481

[56] References Cited

U.S. PATENT DOCUMENTS

| | | | |
|---|---|---|---|
| 1,767,124 | 6/1930 | Flanagan | 60/474 |
| 2,096,574 | 10/1937 | Denny | 60/478 |
| 2,170,029 | 8/1939 | Liddell et al. | 60/478 X |
| 2,352,390 | 6/1944 | Kirkland | 60/474 X |
| 2,584,431 | 2/1952 | Dearsley | 60/478 X |
| 2,618,929 | 11/1952 | Bidin | 60/478 |
| 3,370,421 | 2/1968 | Piper | 60/474 X |
| 4,031,619 | 6/1977 | Gregory | 60/477 X |
| 4,716,812 | 1/1988 | Koerner et al. | 60/413 X |
| 4,796,461 | 1/1989 | Mead | 60/479 X |
| 4,947,672 | 8/1990 | Pecora et al. | 60/477 X |
| 5,105,622 | 4/1992 | Lindner | 60/473 |

*Primary Examiner*—Edward K. Look
*Assistant Examiner*—John Ryznic
*Attorney, Agent, or Firm*—Fiddler Levine & Mandelbaum

[57] ABSTRACT

An airless hand held hydraulic pump unaffected by gravity continuously maintains pressure on the fluid in a dynamic reservoir chamber to enable pumping into a dynamic pressure chamber for actuating a forcing rod irrespective of the orientation of the pump. A release valve permits fluid return from the pressure chamber into the reservoir chamber. The pump can be fitted with a tool such as a door forcer.

10 Claims, 7 Drawing Sheets

FIG. 4B
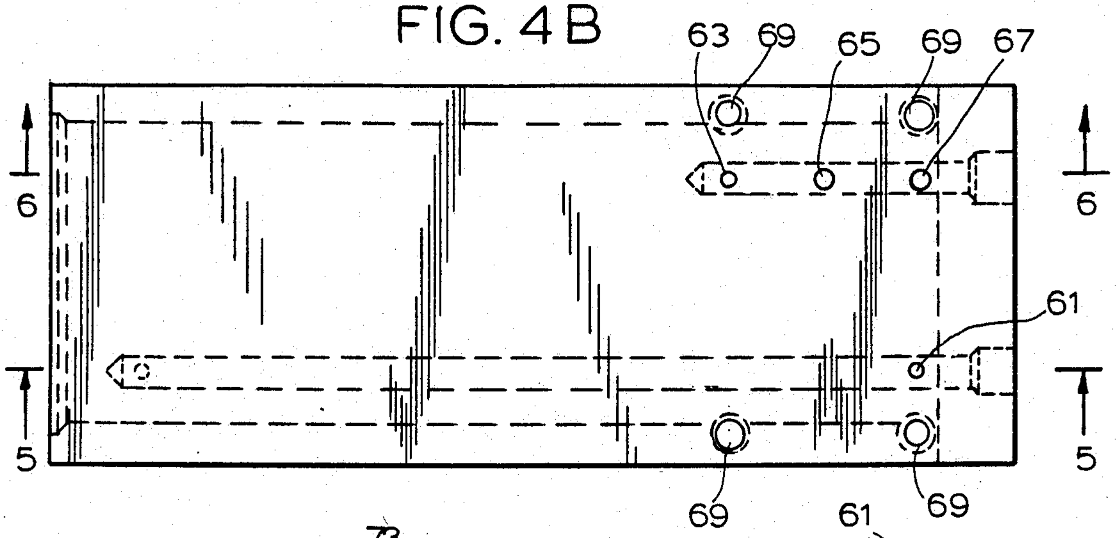
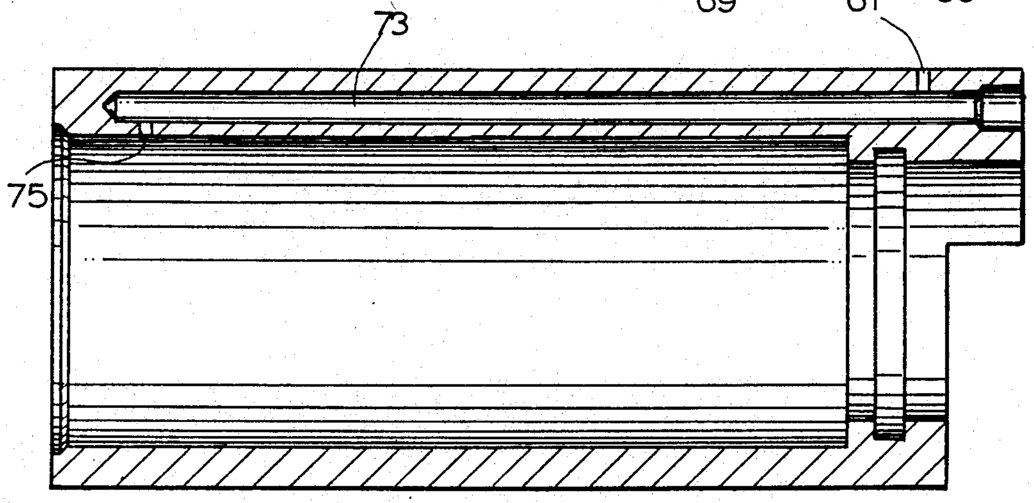
FIG. 5
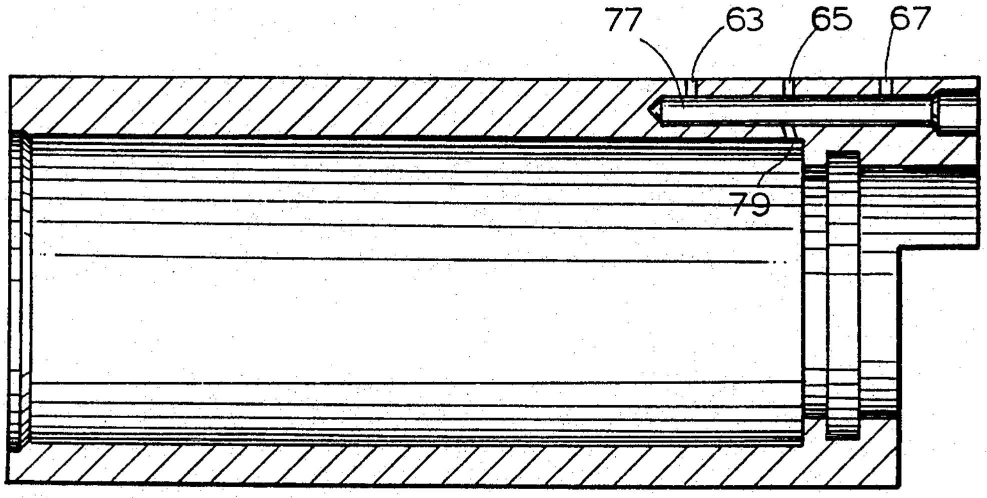
FIG. 6

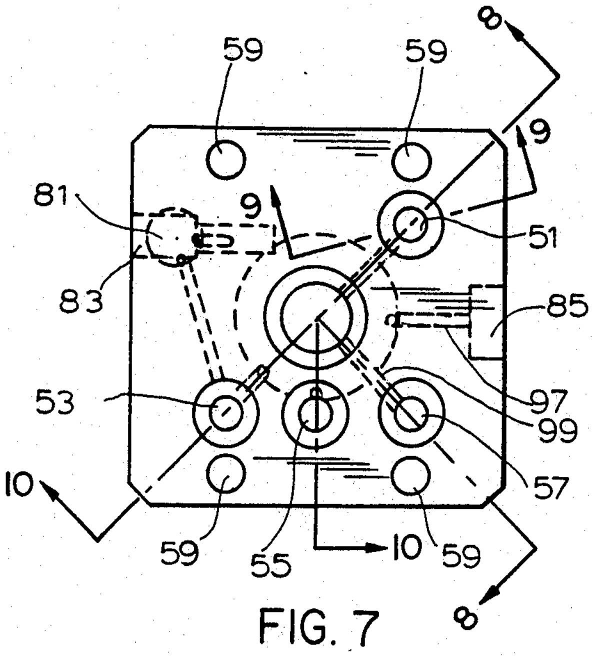
FIG. 7
FIG. 8
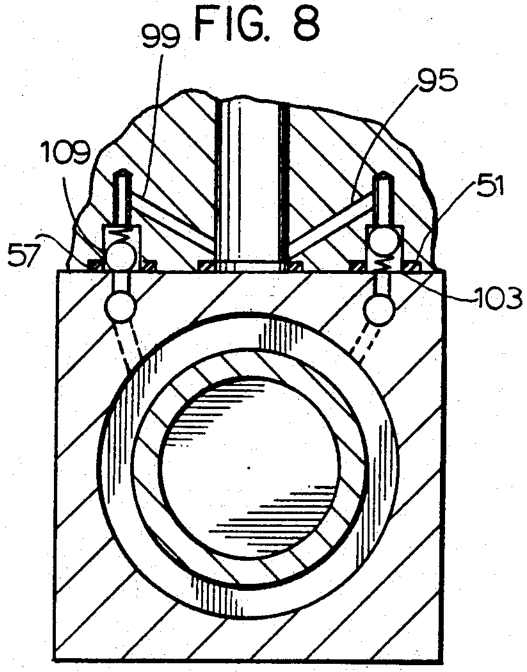
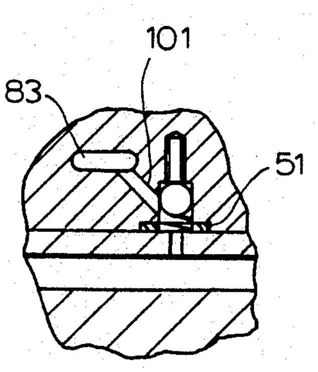
FIG. 9
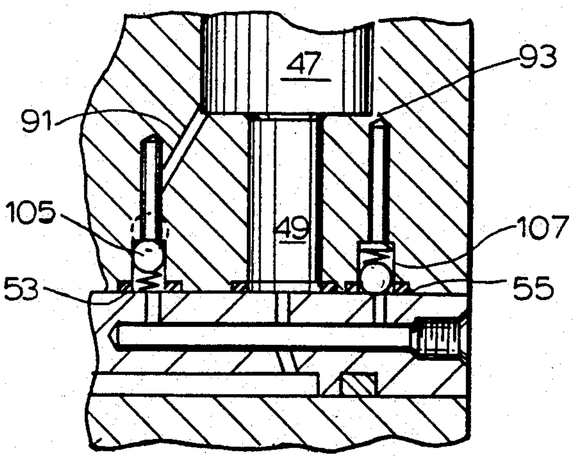
FIG. 10

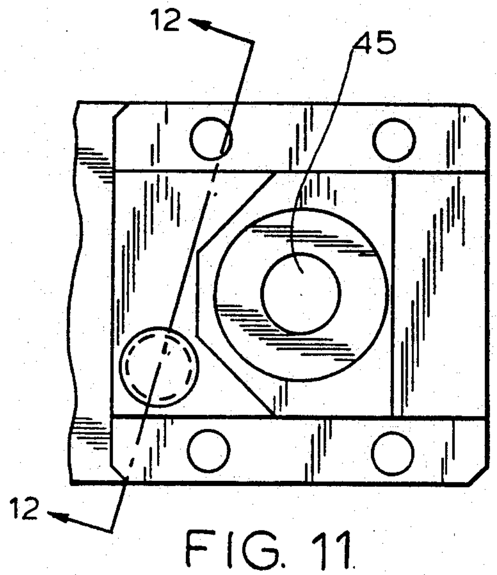
FIG. 11
FIG. 12
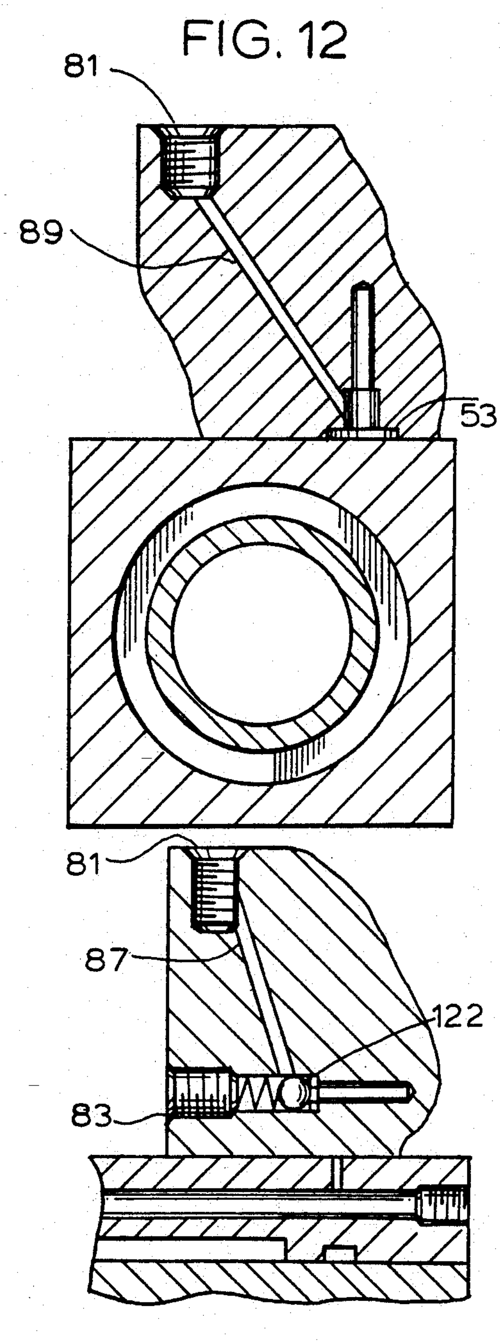
FIG. 14
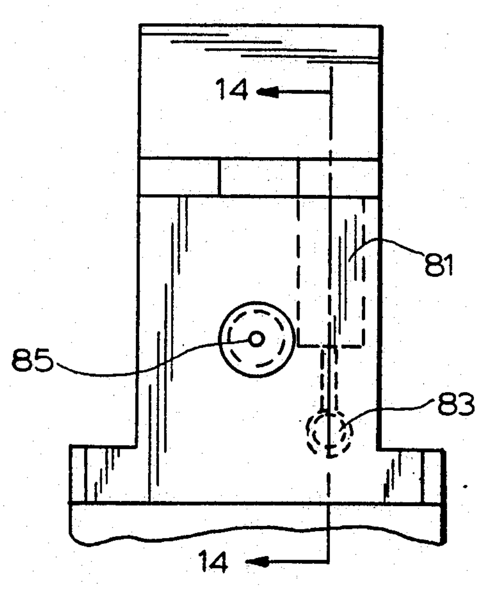
FIG. 13

HAND OPERATED HYDRAULIC PUMP HAVING PRESSURIZED RESERVOIR WITHIN PISTON

BACKGROUND OF THE INVENTION

The application of mechanical advantage to enable manually applied forces to be multiplied for accomplishing tasks requiring super human strength is well known. Levers and pulleys are commonly used to enable men to lift weights far exceeding the force which they are capable of directly applying.

Fluid driven pistons slidably disposed in cylinders have long been employed in the application of mechanical advantage to accomplish lifting tasks. Bottle jacks are examples of lever actuated fluid driven piston devices which enable a man to lift a vehicle weighing several tons off the ground.

The forces generated by fluid driven piston devices can be harnessed for use in applications other than lifting. For example, hand held hydraulic presses which are fluid driven piston devices that use mechanical advantage to multiply force are used by fire and police departments to separate two members after they are wedged between a door and a door frame to force the door open.

Conventional hand held hydraulic presses generally have a tubular reservoir to store the hydraulic fluid, a piston slidably mounted in a cylinder which may extend from the reservoir, a hose into which fluid from the reservoir is pumped from the cylinder by the action of the piston, and an operating device, e.g., a separable toe and foot door forcer, attached to the other end of the hose for being actuated by the fluid pumped under high pressure. In addition to being large and clumsy to use, conventional hand held hydraulic presses depend on gravity to keep the fluid in the reservoir and must, therefore, be operated in an upright position. If they are turned upside down, the fluid flows out of the reservoir and cannot be pumped into the cylinder to exert force against the piston.

SUMMARY OF THE INVENTION

The present invention overcomes the aforementioned disadvantages of the prior art by providing a hand held hydraulic pump which is free of air, independent of gravity, light in weight and operable in any orientation for generating substantial forces. More specifically the present invention provides for a hand operated hydraulic pump including a body having a cylindrical bore with a first end and a second end, forcing rod means slidably mounted in the bore for axial movement toward the second end to an extended position and toward the first end to a retracted position, the forcing rod means including chamber partition means in slidable sealing engagement with the housing for dividing the bore into a pressure chamber and a reservoir chamber, tension means connected between the body and the forcing rod means including a spring which is extended as the forcing rod means moves toward the second housing end for urging the forcing rod means toward the retracted position, a charge of hydraulic fluid in the bore, pressure means mounted in the body for continuously maintaining the fluid in the reservoir chamber under pressure including reservoir piston means slidably mounted in the bore and a spring means disposed in the bore between the second housing end and reservoir piston means for urging the reservoir piston means toward the first housing end, valve means mounted on the housing between the pressure chamber and the reservoir chamber for selectively enabling fluid return from the pressure chamber into the reservoir chamber, and pump means mounted on the housing for pumping the fluid from the reservoir chamber into the pressure chamber for urging the forcing rod means toward the extended position, the pump means being continuously primed in response to the pressure means, and tool means having a first member fixedly connected to the housing and a second member fixedly connected to the forcing rod means whereby the second member is movable with respect to the first member as the forcing rod means is urged toward the second position.

It is therefore an object of the invention to provide an apparatus which can generate substantial mechanical force while hand held and actuated.

Another object of the invention is to provide an apparatus which can generate substantial mechanical force in any orientation.

Still another object of the invention is to provide an apparatus which can readily receive interchangeable tools intended to be operated with substantial mechanical force.

Still a further object of the invention is to provide an apparatus for generating substantial mechanical force which is compact and easily carried and manipulated.

Other and further objects of the invention will be apparent from the following drawings and description of a preferred embodiment of the invention in which like reference numerals are used to indicate like parts in the various views.

DESCRIPTION OF THE DRAWINGS

FIG. 4B is a plan view of the part of the apparatus of the preferred embodiment of the invention shown in FIG. 4A.

FIG. 5 is a sectional elevation view of the part of the apparatus of the preferred embodiment of the invention shown in FIG. 4B taken through line 5—5.

FIG. 6 is a sectional elevation view of the part of the apparatus of the preferred embodiment of the invention shown in FIG. 4B taken through line 6—6.

FIG. 7 is a bottom plan view of a second part of the apparatus of the preferred embodiment of the invention.

FIG. 8 is a sectional elevation view of assembled parts of the apparatus of the preferred embodiment of the invention taken through lines 8—8 of FIG. 7.

FIG. 9 is a partial sectional elevation view of the part of the apparatus of the preferred embodiment of the invention shown in FIG. 7 taken through line 9—9.

FIG. 10 is a sectional elevation view of the part of the apparatus of the preferred embodiment of the invention shown in FIG. 7 taken through lines 10—10.

FIG. 11 is a partial top plan view of the assembled parts of the apparatus of the preferred embodiment of the invention shown in FIGS. 4A and 7.

FIG. 12 is a sectional elevation view of the parts of the apparatus of the preferred embodiment of the invention shown in FIG. 11 taken through line 12—12.

FIG. 13 is a partial elevation view of the parts of the apparatus of the preferred embodiment of the invention shown in FIG. 11.

FIG. 14 is a sectional elevation view of the parts of the apparatus of the preferred embodiment of the invention shown in FIG. 11 taken through line 14—14 of FIG. 13.

DESCRIPTION OF THE PREFERRED EMBODIMENT

Figure 1:
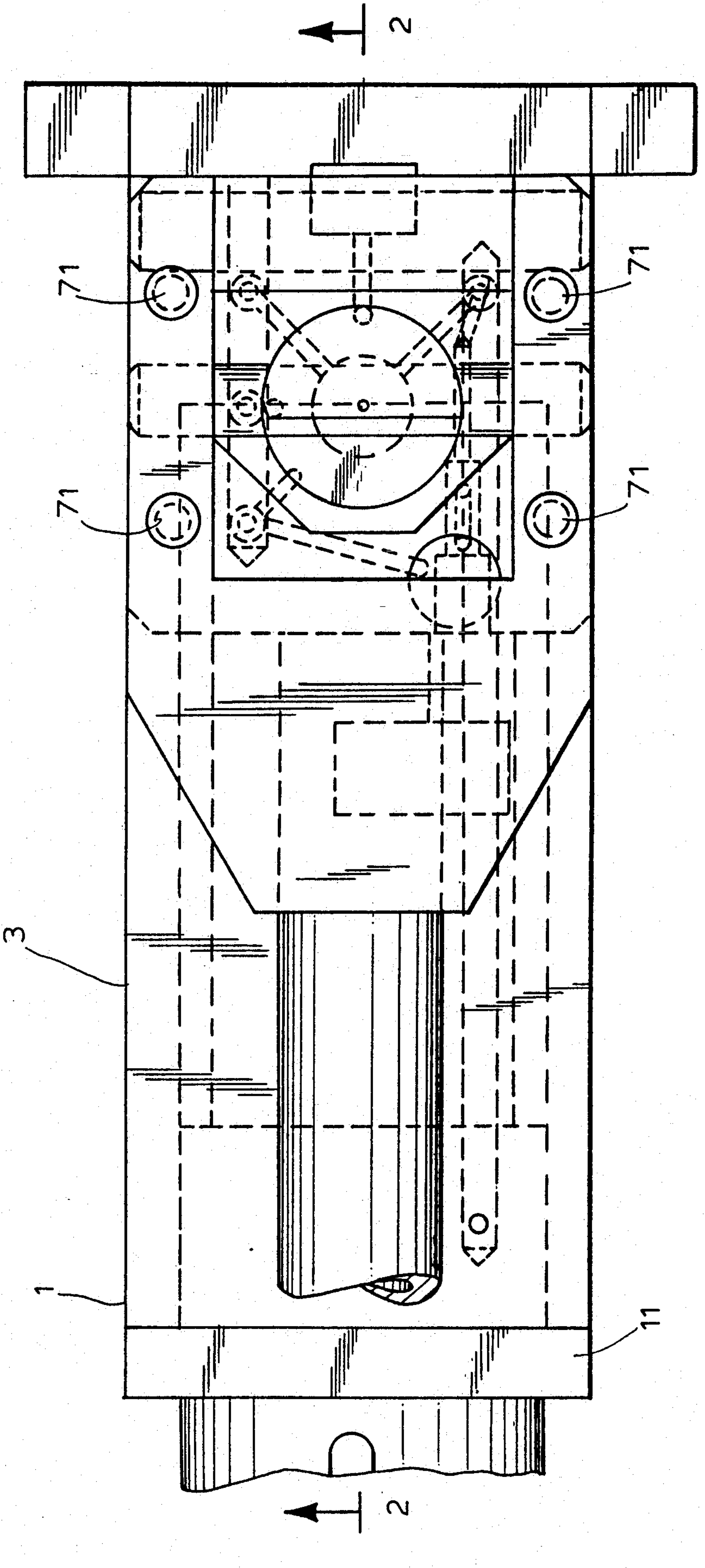
FIG. 1 is a fragmentary top plan view of the apparatus of the preferred embodiment of the invention.
Figure 2:
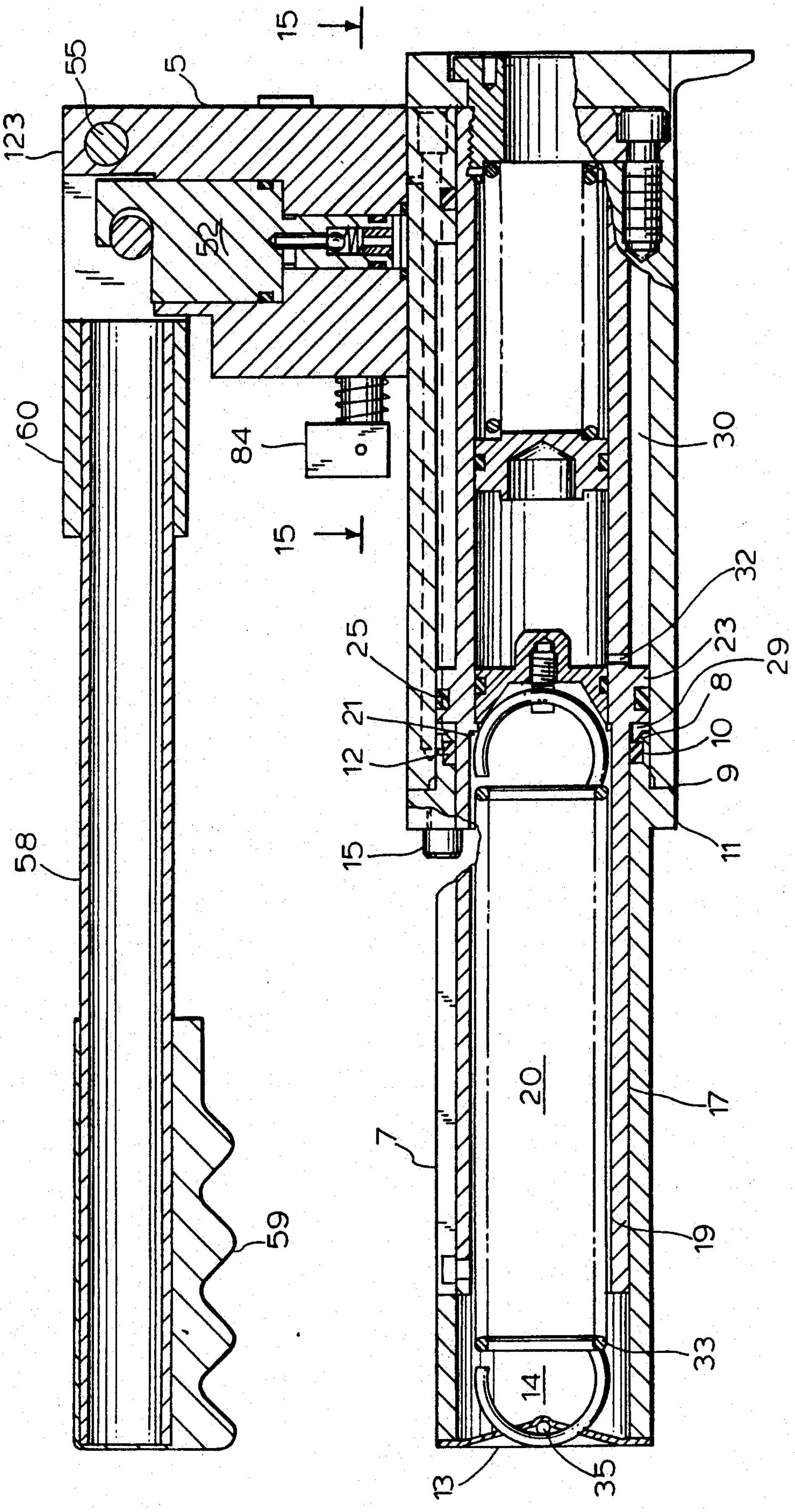
FIG. 2 is a sectional elevation view of the apparatus of the preferred embodiment of the invention in a first disposition taken through line 2—2 of FIG. 1.
Figure 3:
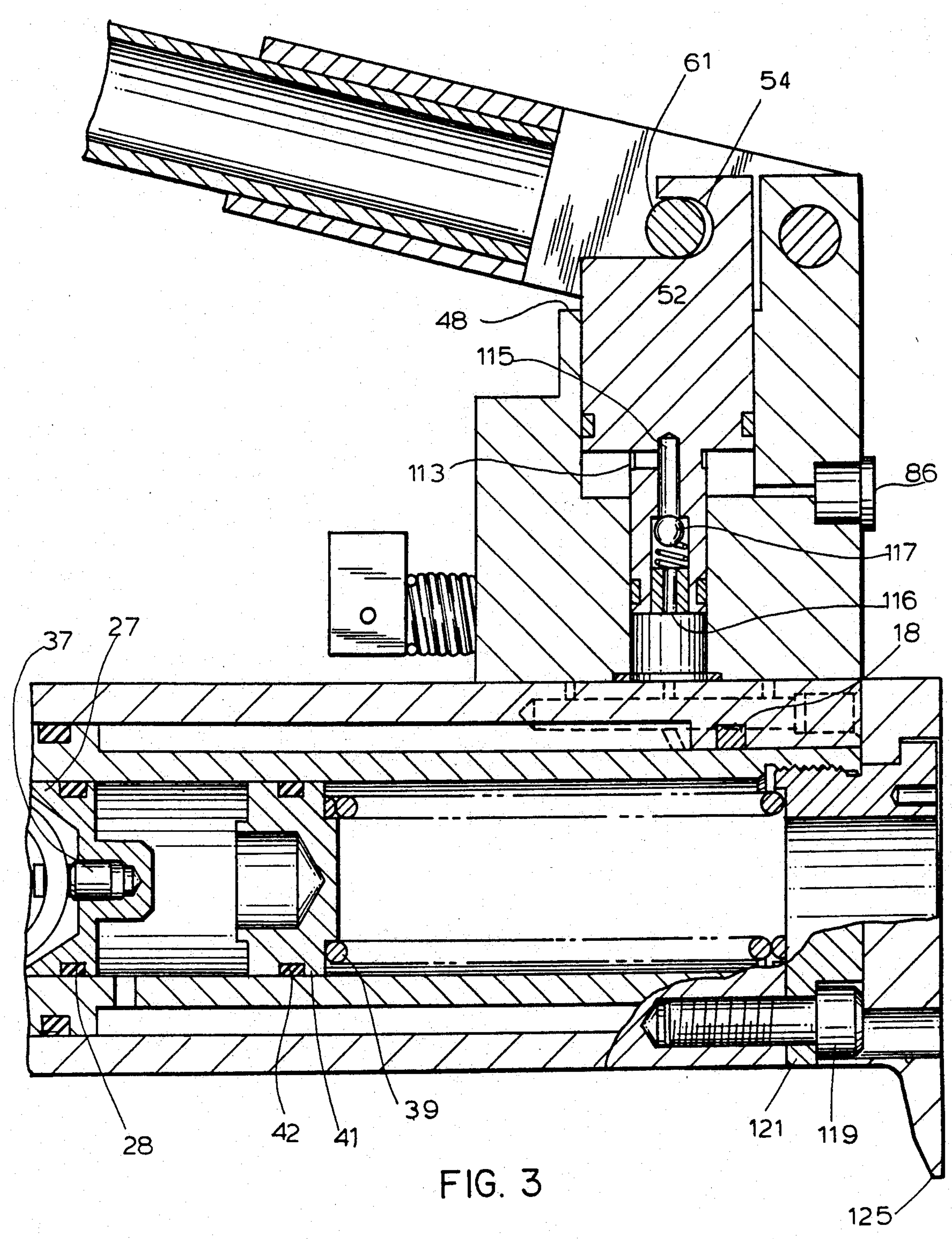
FIG. 3 is a fragmentary sectional elevation view of the apparatus of the preferred embodiment of the invention similar to that taken through line 2—2 of FIG. 1 but in a second disposition.

Referring now to FIGS. 1-3 of the drawings, there is shown a hand held hydraulic press having an elongated body 1 comprising a reservoir housing 3, in the form of a modified rectangular parallelopiped, in which there is a circular cylindrical bore 4, and a pump housing 5 mounted on one end of the reservoir housing 3. An elastomeric O-ring 18 is seated within a circumferential groove in the inner wall of the mouth of the reservoir housing 3.

A cylindrical sleeve 7 has an open end 9 surrounded by a rectangular flange 11, a closed end 13, and a circular cylindrical bore 14. Extending beyond the flange 11 is a short circular cylindrical extension 8 of the sleeve 7 which has an outer diameter substantially equal to the inner diameter of the reservoir housing bore 4. Disposed within the mouth of the sleeve extension 8 is a circumferential groove 10 in which there is seated an elastomeric O-ring 12.

The sleeve 7 is attached to the reservoir housing 3 with its cylindrical extension 8 received in the bore 4 of the reservoir housing 3 and secured by four bolts 15 inserted into the end corners of the reservoir housing 3 through apertures in the corners of the flange 11. When the sleeve 7 is mounted on the reservoir housing 3 the respective circular bores 4 and 14 of the reservoir housing 3 and sleeve 7 are coaxial and the reservoir housing 3 and sleeve 7 form a stepped master cylinder 17.

Slidably mounted in the circular cylindrical bores 4 and 14 of the stepped master cylinder 17 is an elongated hollow circular cylindrical forcing rod 19 having a circular cylindrical bore 20. A circumferential shoulder 21 is raised on the interior circular cylindrical wall of the forcing rod 19. On the outer surface of the forcing rod is a circumferential shoulder 23 grooved to receive an elastomeric O-ring 25 which forms a sliding seal with the inner wall of the cylindrical bore 4 of the reservoir housing 3. The outer circumference of the rod 19 forms a sliding seal with the O-ring 12 in the mouth of the sleeve 7 and the O-ring 18 in the mouth of the reservoir housing 3. An expandable and collapsible pressure chamber 29 is formed between the O-rings 12 and 25 and between the inner wall of the reservoir housing 3 and outer wall of the forcing rod 19. An expandable and collapsible reservoir chamber 30 is formed between the O-rings 25 and 18 and between the inner wall of the reservoir housing 3 and outer wall of the forcing rod 19.

A return spring plug 27 is disposed in the interior bore 20 of forcing rod 19. The return spring plug 27 is circumscribed by an O-ring 28 in sliding sealing engagement with the inner cylindrical wall of the rod 19. One end of a return spring 33 is connected to the interior of the closed end 13 of sleeve 7 by a roll pin 35. The other end of the return spring 33 is connected by a screw 37 to the return spring plug 27. The shoulder 21 on the interior of forcing rod 19 is engaged by the return spring plug 27 under tension from the spring 33 for urging the forcing rod 19 toward its retracted position within the master cylinder 17, i.e., toward the closed end 13 of sleeve 7.

A reservoir chamber 31 is in communication with reservoir chamber 30 via an aperture 32 in the cylindrical wall of the rod 19. The reservoir chambers 30 and 31 are filled with a charge of hydraulic fluid. A reservoir spring 39 disposed in the bore of the reservoir housing 3, under compression, continuously urges a reservoir piston 41 against the fluid in the reservoir chamber 31 disposed within the bore of rod 19 between the return spring plug 27 and the reservoir piston 41. The reservoir piston 41 has a circumferential groove in which there is mounted an elastomeric O-ring 42 in sliding sealing engagement with the inner cylindrical wall of the rod 19.

The pump housing 5, is mounted atop one end of the reservoir housing 3. Referring additionally to FIGS. 4B-14, extending through the pump housing 5 is a stepped central bore 45 having an enlarged diameter portion defining a large cavity 47 which extends through an upper surface 48 of the pump housing 5 above a smaller diameter portion defining a small cavity 49 which extends through the bottom surface of the pump housing 5. Also extending through the bottom surface of the pump housing 5 are cylindrical cavities 51, 53, 55 and 57 which respectively are in alignment and communication with bores 61, 63, 65, and 67 through the upper surface of reservoir housing 3 when the pump housing 5 is mounted on the reservoir housing 3. Bores 61, 63, 65 are in communication with a short longitudinal circular cylindrical bore 77 and bore 61 is in communication with a long longitudinal circular cylindrical bore 73 in reservoir housing 3. Pump housing 5 is fixed to reservoir housing 3 by screws 71 which are passed through apertures 59 in pump housing 5 and threaded into apertures 69 in reservoir housing 3.

As can be seen in FIGS. 7-10, cavity 53 is in communication with large cavity 47 via canal 91. Cavity 55 is in communication with large cavity 47 via canal 93. Cavity 51 is in communication with small cavity 49 via canal 95. A charging cavity 85 is also in communication with large cavity 47 via canal 97. Cavity 57 is in communication with small cavity 49 via canal 99. (See FIG. 7).

The bore 73 in the upper wall of reservoir housing 3 extends from the bore 61 to an aperture 75 in communication with pressure chamber 29. The bore 77 which is parallel to the bore 73 in the upper wall of reservoir housing 3 is in communication with apertures 63, 65 and 67 and with an aperture 79 which is, in turn, in communication with reservoir chamber 30.

Figure 15:
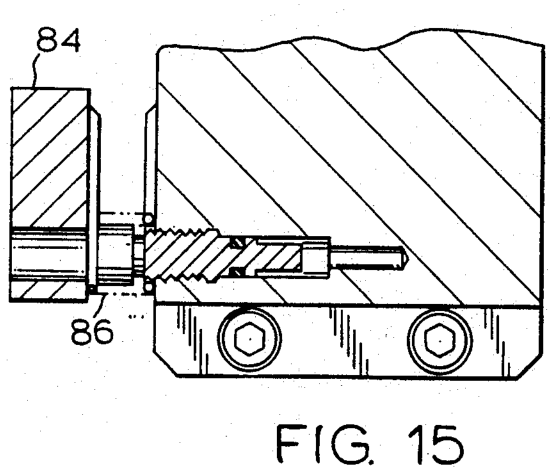
FIG. 15 is a sectional view of the apparatus of the preferred embodiment of the invention taken through line 15—15 of FIG. 2.
Figure 4A:
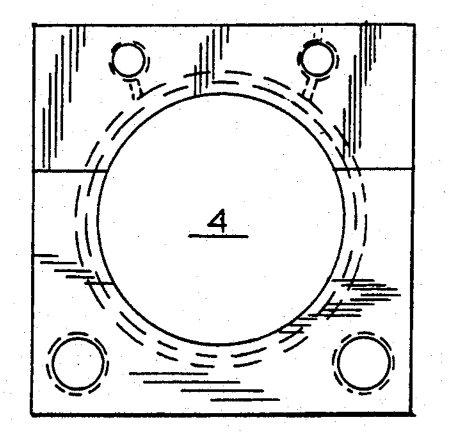
FIG. 4A is an end view of one part of the apparatus of the preferred embodiment of the invention.

Referring to FIGS. 3, 7 and 15, a pressure relief port 83 is threaded to receive the threaded shaft of a pressure relief lever 84 which can be rotated against the force of a return spring 86. As further seen in FIG. 14, the pressure relief port 83 communicates with a blind junction port 81 via a canal 87. As seen in FIG. 12, junction port 81, in turn, communicates with bore 53 via a canal 89. Pressure relief port 83 also communicates with cavity 51 through canal 101 as shown in FIG. 9.

A ball valve 103 is disposed in cavity 51 to permit unidirectional flow from the cavity 51 to the bore 73 in the upper wall of reservoir housing 3. A ball valve 105 is disposed in the cavity 53 to permit unidirectional flow from the cavity 53 to the bore 77 in the upper wall of reservoir housing 3. A ball valve 107 is disposed in the cavity 55 to permit unidirectional flow from the cavity 55 to the large cavity 47. A ball valve 109 is disposed in the cavity 57 to permit unidirectional flow from the cavity 57 to the small cavity 49.

Mounted on the pump housing 5 at its end distal from the reservoir housing 3 is a pivot pin 55. A handle 58 having a grip 59 at one end is connected to one end of a lever 60. The other end of the lever 60 is rotatably mounted on the pump housing 5 via the pivot pin 55. The handle 58 can be swung from a position parallel to the master cylinder 17 as shown in FIG. 2 to a position away from the master cylinder 17 as shown in FIG. 3.

A stepped cylindrical pump piston 52 has an enlarged portion of outer diameter substantially equal to the inner diameter of the large cavity 47 and a coaxially distended reduced portion of outer diameter substantially equal to the inner diameter of the small cavity 49 of pump housing 5. O-rings are provided in circumferential grooves on the respective exteriors of the enlarged and reduced portions of piston 52. The reduced portion of piston 52 has a radial bore 113 leading to an axial cavity 115 which extends through the center of the its circular exposed end to a central exit opening 116. Unidirectional flow of hydraulic fluid from the bore 113 out of the cavity 115 is maintained by a ball valve 117.

Fixedly mounted on the lever 60 is a dowel pin 61 which is moved toward and away from the pump housing 5 as the handle 58 is swung toward and away from the master cylinder 17. The pump piston 52 has a groove 54 for rotatably receiving dowel pin 61. Hence as the handle 58 is swung away from the master cylinder 17, the pump piston 52 is raised and as the handle 58 is swung toward the master cylinder 17, the pump piston 52 is lowered.

The reservoir chambers 30 and 31 are completely filled with a substantially incompressible hydraulic fluid through the charging cavity 85 via an external pump (not shown). The fluid is pumped from the charging cavity 85 through canal 97 into the large cavity 47, through canal 91, through ball valve 105 in cavity 53, through bore 63 into bore 77, through aperture 79 into reservoir chamber 30, through aperture 32 in the cylindrical wall of the rod 19 and into reservoir chamber 31. The hydraulic fluid is kept under pressure by the force of the compressed fluid pressure spring 39 on the reservoir piston 41. After filling, the charging cavity 85 is sealed by a plug 86.

In use, as the handle 58 is swung away from the master cylinder 17, the piston 52 is moved upwardly and the fluid in the reservoirs 30 and 31, under pressure from the piston 41, is drawn into bore 77 through aperture 79 and then, through bore 65, through cavity 55, valve 107 and canal 93 into the large cavity 47, and through bore 67, through cavity 57, valve 109 and canal 99 into the small cavity 49, of pump housing 5 thereby priming the pump.

When the handle 58 is pressed inwardly toward the body 1, fluid in the small pump housing cavity 49 is forced through canal 95, through valve 103 in cavity 51 and through bore 61 into bore 73 in reservoir housing 3. The fluid exits from bore 73 through aperture 75 and into pressure chamber 29 rearward of the shoulder 23 of the forcing rod 19, thereby urging the forcing rod 19 to extend out of the master cylinder 17, i.e., to the right in the view of FIGS. 1 and 2. As fluid is pumped from the reservoir chambers 30 and 31 into the pressure chamber 29 by reciprocation of the handle 58, the return spring plug 27 moves forward with the forcing rod 19 extending from the reservoir housing 3 so that the pressure chamber 29 increases by the volume of the pumped fluid while the reservoir chambers 30 and 31 correspondingly decrease in volume with movement of the rod 19 and piston 41.

A two-stage pumping action takes place as follows. The fluid in the large cavity 47 of the pump housing 5 is initially forced through piston bore 113 and valve 117 into the small cavity 49. After the pressure increases to a level at which valve 117 cannot open, only fluid from the small chamber 49 is pumped into the reservoir 30. The fluid from the large cavity passes through canal 91, through valve 105, into cavity 53, through bore 63, into bore 77, through aperture 79 and into reservoir 30. The spring in valve 105 is stronger than the spring in valve 117 so that fluid doesn't pass into bore 77 from cavity 53 until the pressure increase.

Optionally fixedly mounted on the body 1 by bolts 119 is a wedge shaped toe 121 adapted to be driven between a door and a door jam. An impact surface 123 in a plane transverse to the major plane of the toe 121 is provided on the piston pump housing 5. The impact surface is adapted to be struck with a hammer or other impact instrument to drive the toe 121 between the door and door jam. Also, optionally fixedly mounted on the extended end of the forcing rod 19 by complementary threads is a dual-pronged foot 125 which pushes on the door when the toe 121 is wedged between the door and door jam and the forcing rod 19 is extended outwardly under the force of the hydraulic fluid and against the force of the return spring 33.

The pressure release lever 84 is actuated to enable the fluid in the pressure chamber 29 to return to the reservoir chambers 30 and 31 so that the rod 19 may be retracted. As the fluid in the pressure chamber 29 returns to the reservoir chambers 30 and 31, the force of the fluid on the forcing rod 19 is relieved and overcome by the force of the extended return spring 33 which urges the forcing rod 19 rearwardly, i.e., to the left in the view of FIG. 2, to its retracted position.

When the release lever 84 is turned to back its threaded shaft out of the relief port 83, communication is enabled between the pressure chamber 29 on the downstream side of valve 103 in cavity 51 and the upstream side of valve 105 in cavity 53 via canal 101, pressure relief port 83, canal 87, blind junction port 81, and canal 89. A ball valve 122 disposed in pressure relief port 83 ensures that the flow is unidirectional from cavity 51 to cavity 53. From cavity 53, the fluid enters the reservoirs 30 and 31 via bore 63, bore 77, and aperture 79. As the fluid is pumped from the pressure chamber 29 into the reservoir chambers 30 and 31, the spring 33 retracts the rod 19.

It is to be appreciated that the foregoing is a description of a preferred embodiment of the invention to which variations and modifications may be made without departing from the spirit and scope of the invention. For example, tools, other than the toe 67 and foot 69, requiring the application of substantial force by a hand holdable, gravity immune device can be attached to the body 1 and rod 2.

What is claimed is:

1. A hand operated hydraulic press comprising a body having a cylindrical first bore with a first end and a second end, hollow forcing rod means slidably mounted in said first bore for axial movement toward said second end to an extended position and toward said first end to a retracted position, said forcing rod means comprising chamber partition means in slidable sealing engagement with said body for dividing said first bore into a pressure chamber and a reservoir chamber, a charge of hydraulic fluid in at least one of said pressure and reservoir chambers, pressure means mounted in said body for continuously maintaining the fluid in said reservoir chamber under pressure, said pressure means comprising reservoir piston means slidably mounted within said hollow forcing rod means and a spring means within said hollow forcing rod means disposed between said body second end and said reservoir piston means for urging said reservoir piston means toward said body first end, and pump means mounted on said body for pumping said fluid from said reservoir chamber into said pressure chamber for urging said forcing rod means toward said extended position.

2. A hand operated hydraulic press according to claim 1 further comprising tension means connected between said body first end and said forcing rod means for urging said forcing rod means toward said retracted position.

3. A hand operated hydraulic press according to claim 2 further comprising relief means mounted on said body between said pressure chamber and said reservoir chamber for selectively enabling fluid return from said pressure chamber into said reservoir chamber.

4. A hand operated hydraulic press according to claim 1 wherein said body has a second bore in communication with said pressure chamber and said reservoir chamber, and said pump means comprises piston means slidably disposed in said second bore for movement between an intake position and a pressure position for urging said fluid to flow from said reservoir chamber into said pressure chamber when said piston means is urged toward said pressure position and for enabling said fluid to flow from said reservoir chamber into said second bore under pressure from said pressure means when said second piston is in said intake position.

5. A hand operated hydraulic press according to claim 4 further comprising lever means pivotally connected to said body and also connected to said piston means for selectively moving said piston means between said intake and pressure positions, said lever means being substantially parallel to said first bore when said piston is in one of said intake and pressure positions.

6. A hand operated hydraulic press according to claim 5 wherein said piston means is mounted adjacent said second end of said body and said lever extends from said piston means toward said first end of said body.

7. A hand operated hydraulic press according to claim 2 wherein said tension means comprises a spring which is extended as said forcing rod means moves toward said body second end.

8. A hand operated hydraulic press according to claim 1 further comprising tool means having a first member fixedly connected to said body and a second member fixedly connected to said forcing rod means whereby said second member is movable with respect to said first member as said forcing rod means is extended.

9. A hand operated hydraulic press according to claim 8 wherein said first member has a substantially planar wedge shaped portion.

10. A hand operated hydraulic press according to claim 9 wherein said body has a striking surface in a plane substantially transverse to said first member planar wedge shaped portion whereby said wedge shaped portion may be driven in response to impact exerted against said striking surface.

* * * * *